W. S. BURTON.
PNEUMATIC STACKER MECHANISM.
APPLICATION FILED MAR. 7, 1916.

1,222,180.

Patented Apr. 10, 1917.

Witness.
G. F. Jurechek.

Inventor
William S. Burton.
By Orwig & Bair
Attys.

UNITED STATES PATENT OFFICE.

WILLIAM S. BURTON, OF AMES, IOWA.

PNEUMATIC STACKER MECHANISM.

1,222,180.  Specification of Letters Patent.  Patented Apr. 10, 1917.

Application filed March 7, 1916. Serial No. 82,768.

*To all whom it may concern:*

Be it known that I, WILLIAM S. BURTON, a citizen of the United States, and resident of Ames, in the county of Story and State of Iowa, have invented a certain new and useful Pneumatic Stacker Mechanism, of which the following is a specification.

The object of my invention is to provide a pneumatic stacker mechanism of simple, durable and inexpensive construction.

A further object is to provide such a mechanism adapted to be used in connection with a threshing machine separator, whereby the chaff and the like and the straw may be kept separated and given different points of discharge, or whereby they may be discharged together if desired.

Still a further object is to provide a machine of the type mentioned in which the straw is subjected to the action of an air circuit, but is not subjected to contact with a fan or the like which might break the straw.

A further object is to provide such a device so made that it may be readily and easily adjusted to any other ordinary separator.

With these and other objects in view, my invention relates to the construction, arrangement and combination of the various parts of the device, whereby the objects contemplated are attained, as hereinafter more fully set forth, pointed out in my claims, and illustrated in the accompanying drawings, in which:

Figure 1:
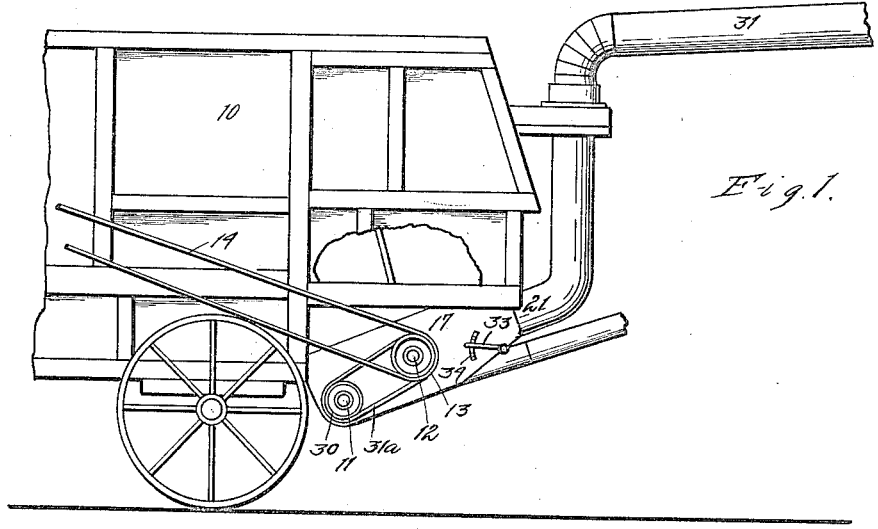
Figure 1 shows a side elevation, partly broken away, of one end of a threshing machine mechanism equipped with a pneumatic stacker mechanism embodying my invention.

In the form of my invention illustrated in the accompanying drawings, I have used the reference numeral 10 to indicate generally that portion of a grain separator shown. Mounted on the frame of the stacker 10 are two spaced shafts 11 and 12. On one of the shafts 12 is a belt pulley 13 adapted to be connected by a pulley 14 with some operative mechanism of the separator whereby rotary motion may be imparted to the shaft 12.

Figure 2:
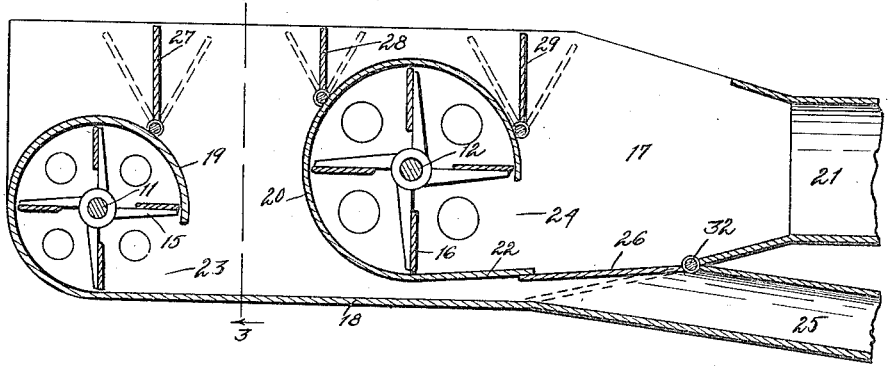
Fig. 2 shows a longitudinal, sectional view through my improved mechanism.
Figure 3:
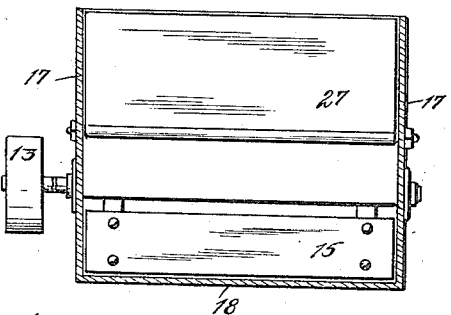
Fig. 3 shows a vertical, transverse, sectional view, taken on the line 3—3 of Fig. 2.

Mounted on the shafts 11 and 12 are fans 15 and 16, shown in Fig. 2. The fans 15 and 16 are received within the casing, and have the side walls 17 and the bottom 18. Within each casing mounted between the side walls 17 are fan casings 19 and 20 which receive the fans 15 and 16. The upper portion of the casing is open.

Communicating with the rearward end of the casing is an upper discharge pipe 21. The bottom 18 forms the bottom of the casing 19. The casing 20 has a bottom of its own, indicated by the reference character 22, which is spaced above the bottom 18, as shown in Fig. 2. The lower rearward parts of each fan casing 19 and 20 have openings 23 and 24, as illustrated in Fig. 2.

Communicating with the lower part of the larger casing, near the rearward portion thereof, is a chaff discharge pipe 25. A hinged closure member may be moved to position for coacting with the member 22 for closing the bottom of that portion of the main or large casing, and rearwardly of the fan 16, as shown by full lines in Fig. 2, or may be dropped to the position, as shown by dotted lines in Fig. 2, where said member 26 closes the fan end of the chaff discharge pipe 25.

Arranged between the members 17, just above the forward portion of the fan casing 19, is a transverse partition member 27, pivoted at its lower edge, as shown in Fig. 2. When the partition member 27 is in vertical position, it stands flush with the upper edge of the members 17. Similar transverse partition members 28 and 29 are pivoted at their lower edges near the rearward upper portion and the forward upper portion, respectively, of the fan casing 20.

The members 28 and 29 when in vertical position stand with their upper edges substantially flush with the upper edges of the member 17. The members 27, 28 and 29 may be swung forwardly or rearwardly to various positions, as illustrated by the dotted lines in Fig. 2, in the upper portion thereof, so that they may be fitted on various makes of machines, whereby my device may be mounted on various machines as an attachment and may be readily and easily adjusted to make a chute for the chaff from the space between the members 28 and 27, and a chute for the straw in the rear of the member 29.

The shafts 11 and 12 project laterally beyond the casing members 17, and have wheels 30 connected by a bolt 31$^a$, whereby the shaft 11 is run from the shaft 12.

In the practical use of my improved device, it is mounted on the separator 10 and the pipe 21 is connected with a suitable straw discharge pipe 31. The space between the members 27 and 28 is arranged to receive the chaff discharged from the sieve, and the space in front of the member 29 is arranged to receive the straw.

The shaft 12 is operated by means of the belt 14 and the shaft 11 and the fan thereon is operated from the shaft 12. When the mechanism of the machine is set in motion, the chaff is discharged downwardly, into the space between the fans, and the straw is discharged into the space between the members 17 in the forward part of the casing.

The member 26 is pivoted at its rearward end on a shaft 32, which projects outwardly beyond the casing at the side thereof, and has a handle member 33 adapted to coact with a sector 34, whereby the member 26 may be raised or lowered. When the member 26 is in its position, shown in Fig. 2, the straw will be driven by the draft of the fan 16 through the pipes 21 and 31 to the stack. The chaff will be driven through the pipe 25 into a straw pile.

It will be noted that the straw is not driven through the fan and hence my machine is so constructed as to break the straw very little. The straw may thus be kept clean.

If it is desired to drive the chaff with the straw, then the member 26 may be lowered to the position shown by the lower dotted lines in Fig. 2, and the chaff will be driven through the pipes 21 and 31 with the straw.

It will be noted that with my machine, the chaff and straw may be kept separated or may be driven into the stack together.

It will be understood that some changes may be made in the construction and arrangement of the various parts of my improved stacker mechanism, without departing from its essential features and purposes, and it is my intention to cover by this application any such changes which may be included within the reasonable scope of my claims.

In the drawings I have shown only a conventional form of separator. It will be understood that my device is attached at such a place on the separator that the chaff from the sieves will drop into the chaff compartment and the straw from the tail rake will drop into the straw compartment in the rear of the rearward fan.

I claim as my invention:

1. A stacker device comprising a receptacle, a fan casing in one end thereof, open toward the other end thereof, a second fan casing spaced from the first fan casing and from the bottom of said receptacle, and open on its side away from the first casing, said casing being spaced from the top of said receptacle, fans in said casings, pivoted members extending upwardly from said casings, adapted to form partitions in a variety of positions, said receptacle forming chaff and straw compartments on opposite sides of said second casing, with a passage beneath said second casing connecting said compartments, a discharge pipe leading from the straw compartment, a discharge pipe leading from said passage, and a swinging closure device designed in one position to shut off communication between said passage and said straw compartment and in another position to shut off communication between said passage and said second discharge pipe.

2. In a device of the class described, a casing, a fan casing therein spaced from the bottom of said first casing, a second fan casing therein spaced from said first fan casing, a partition member extending upwardly from said first fan casing within said first casing for dividing said first casing into two compartments on opposite sides of the first fan casing, said fan casings, being arranged with discharge openings in their lower portions for discharging air into the lower parts of the respective compartments, a discharge pipe leading from the compartment farthest from said second fan casing, discharge openings in said last mentioned compartment, a movable closure device adapted in one position to close one of said last openings, said movable closure device being adapted when in such position to shut off communication between said compartments, and to permit egress from the compartment containing the second fan casing, and fans in said casings.

Des Moines, Iowa, January 6, 1916.

WILLIAM S. BURTON.

Copies of this patent may be obtained for five cents each, by addressing the "Commissioner of Patents, Washington, D. C."